Patented May 21, 1940

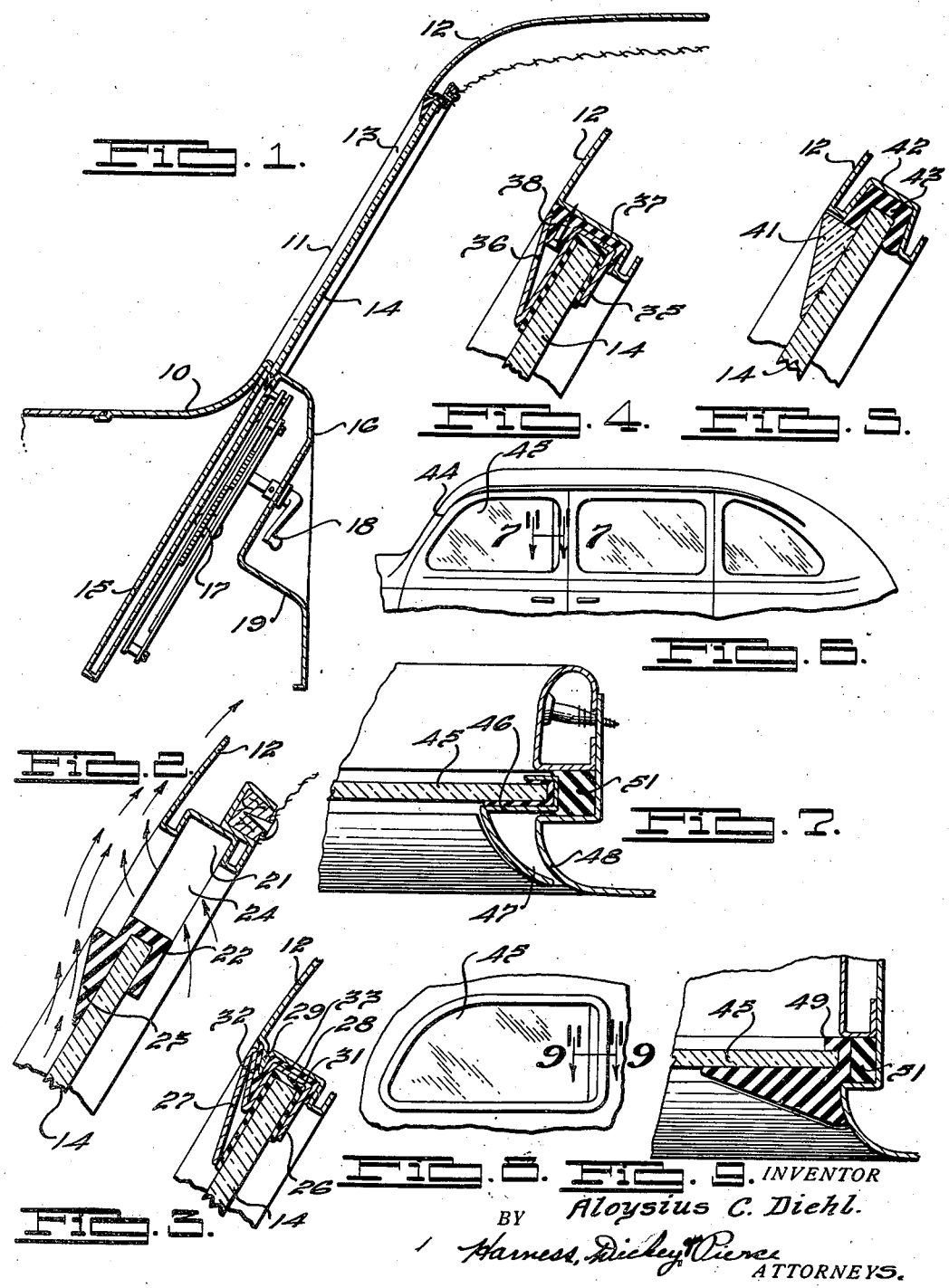

2,201,480

UNITED STATES PATENT OFFICE 2,201,480

VEHICLE VENTILATING MEANS

Aloysius C. Diehl, Monroe, Mich.

Application June 3, 1938, Serial No. 211,635

5 Claims. (Cl. 296—94)

My invention relates to ventilating windows, and particularly to a method and means for ventilating automotive vehicles during the movement thereof, and constitutes a continuation in part of my application, Serial No. 54,113, filed December 12, 1935.

The present application embodies the construction of windows and windshields which, when the window is opened by a sliding movement, will have the marginal edge thereof so disposed that the air will pass across the opening, drawing air outwardly from within said body. To produce such an outward flow of air, at the present time small windows are employed which are pivoted near their forward end to be swung outwardly into the air stream. Sliding windows are also employed forming a narrow opening near the front pillar to have the air flowing around the pillar pass over the opening and cause an outward flow of air from the body.

The present invention utilizes the same principle of projecting the air stream along the body over an opening formed by the sliding movement of a window. This is effected by a frame at the trailing edge of the window which forms a seal with the edge of the body defining the opening. In a windshield construction, the windshield may slide in the plane in which it is disposed, to have an opening appear adjacent to the header or front terminal end of the roof. The windshield is provided with a frame which forms a seal with the marginal front edge of the roof and when separated therefrom forms a deflector for the air. The deflector directs the air stream over the opening and the front terminal edge of the roof to cause an outward flow of air from the body through the opening. A similar deflector may be provided on the rear edge of a side window which forms a seal with the door pillar or body, and provides a deflector when the window is open for directing air across the opening.

Accordingly, the main objects of my invention are to provide a window glass with a frame which forms a seal with the marginal edge of the body defining the window opening and which, when forming an opening with such edge, directs the air from the glass when the body is moving; to slide an angularly disposed windshield in its plane to form an opening with the marginal front edge of the roof and to direct air from the windshield over the opening when the body is moving; to provide a windshield with a frame which forms a seal with the top marginal edge of the roof and a deflector for the air impinging on said windshield to provide a more effective seal when closed and to produce an outward flow of air from the body when open; to provide a sliding window in a vehicle body having an element near the trailing edge for directing air from said window to cause an outward flow of air from within the body; and, in general, to provide ventilating means for a vehicle body which is simple in construction, positive in operation and economical of manufacture.

Other objects and features of novelty of my invention will be either specifically pointed out or will become apparent when referring, for a better understanding of my invention, to the following description, taken in conjunction with the accompanying drawing, wherein Figure 1 is a sectional view of a front end of a vehicle body, embodying features of my invention;

Fig. 2 is an enlarged, broken, sectional view of the structure illustrated in Fig. 1, with the windshield in open position, showing the flow of air which occurs during the movement of the body;

Fig. 3 is a view of structure similar to that illustrated in Fig. 2, showing a modified form thereof, with the windshield in closed position;

Fig. 4 is a view of structure similar to that illustrated in Fig. 3, showing a further form which my invention may assume;

Fig. 5 is a view of structure similar to that illustrated in Fig. 4, showing a still further form of my invention;

Fig. 6 is a broken view of an automobile body, illustrating another form of my invention;

Fig. 7 is an enlarged sectional view of the structure illustrated in Fig. 6, taken on the line 7—7 thereof;

Fig. 8 is a view of structure similar to that illustrated in Fig. 6, showing a further form which my invention may assume; and Fig. 9 is an enlarged sectional view of structure illustrated in Fig. 8, taken on the line 9—9 thereof.

Referring to Fig. 1, I have illustrated a vehicle body, having a cowl 10, windshield pillars 11, and a header 12, joined to form a windshield opening 13. A slidable windshield 14 is employed to close the opening, being disposed in guide channels located in the pillars 11. A receptacle 15 is disposed below the cowl 10, in rear of a dash panel 16, for receiving the windshield 14 and for collecting any water which may flow downwardly from the windshield 14. Suitable mechanism 17 is carried on the receptacle 15 for raising and lowering the windshield 14 operated by a crank handle 18 which is disposed in a recess 19 provided in the dash panel 16.

Fig. 2 is an enlarged view illustrating the upper end of the windshield 14, and the lower portion of the header panel 12. The header panel 12 is provided with a recess 21 which receives a portion of a rubber sealing element 22 provided on the upper edge of the windshield 14. The rubber sealing element 22 is provided with a sloping lip 23 on its outer portion, the upper edge of which is substantially flush with the header panel 12. The lip 23 forms a deflector for directing the flow of air over the windshield 14 outwardly over an opening 24 and the header 12. The flow of air in this manner, when the opening 24 is of small dimension, causes an outflow of the air from the inside of the vehicle body to thereby provide no-draft ventilation thereto. When the windshield 14 is raised the rubber sealing element 22 engages the recess 21 on the header to effectively seal the top edge of the windshield 14 therewith. This seal is aided by the deflection of the air over the joint formed between the element 22 and the header panel 12 which provides an area of reduced pressure at the joint and thereby assists in the sealing of the windshield with the header panel.

In Fig. 3, I have shown a modified form of deflecting structure wherein a metal frame 26 is provided about the edge of the windshield 14, the top edge of which has a deflector portion 27 which joins with the panel 12 and which when slightly spaced therefrom produces an outflow of air from within the body. The header panel 12 is recessed at 28 and is provided with a projecting portion 29, which mate, respectively, with the edge 31 of the frame 26 and with a recess 32, provided frontwardly thereof. A rubber sealing element 33 is secured to the projection 29 and recess 28 to aid in sealing the joint between the frame 26 and the header panel 12. The function of the deflector 27 is the same as that of the lip portion 23 of the element 22 illustrated in Figs. 1 and 2 as described above. The deflector is available to produce an outflow of air, and for aiding in sealing the joint, between the windshield and the header when providing a low pressure area thereat. It is to be understood that when the windshield is lowered a sufficient amount the deflector will no longer be effective for producing an outflow of air and that air will blow directly through the vehicle body over the heads of the occupants, which in some instances is desirable.

In Fig. 4, I have illustrated a further form of my invention, wherein the windshield 14 has a frame 35 thereabout, the outer top edge being provided with a deflector portion 36 which mates with the header panel 12. A rubber sealing element 37 is secured to the edge of the panel 12 and employed for sealing the frame portion 35 therewith and for also sealing the deflector element 36 through the projection of an extending portion 38 on the sealing element between the frame portion 35 and the deflector element 36. The function of the deflector element 36 is the same as that herein described relative to the structure shown in Figs. 2 and 3.

Fig. 5 illustrates a further form which my invention may assume, that of having a deflector portion 41 adhesively secured to the upper edge of the windshield 14. The element 41 may be of glass or other transparent substance such as a cellulose compound or it may be constructed from any translucent or opaque material. The header panel 12 is provided with a channel 42 having a rubber sealing element 43 which receives the upper edge of the windshield 14 in the conventional manner.

In Figs. 6, 7, 8 and 9 I have illustrated a form which my invention assumes when applied to a side window in a vehicle, which may be in the door, a side panel or elsewhere in a vehicle body.

In Fig. 6, I have illustrated a vehicle body having a front door 44, in which a window 45 is disposed, for horizontal and vertical movement. The rear edge of the window 45 is provided with an element 46 having a deflector portion 47 adjacent to the reveal portion of the door panel 48. Suitable mechanism is provided for raising and lowering the window 45 and for advancing it frontwardly after it is raised for producing an opening between deflector 47 and the door panel portion 48. Such an opening provides an outflow of air from the vehicle body due to a flow of air over the windshield 45 deflected by the element 47 over the opening. Suitable operating mechanism known in the art may be employed for producing the compound movement of the window 45 from a single operating element.

In Fig. 8, I have shown a modified form of structure for deflecting air from an opening at the side of the vehicle. Window 45 is provided with a rubber sealing element 49 which is similar to element 22 described in relation to Figs. 1 and 2. When the window is moved horizontally forward of the body, an opening is provided at the rear edge of the window 45 over which air will be deflected by the outer sloping surface of the element 49 as it passes along the window to cause an outflow of air therethrough. A suitable element 51 is provided in the frame of the door for abutting the rear edge of the element 49 to form a seal therewith. The sealing of the joint between the rear edge of the window 45 and the door is assisted by the flow of air over the joint which provides a reduced pressure area therewith.

While I have described and illustrated several embodiments of my invention, it will be apparent to those skilled in the art that various changes, omissions, additions and substitutions may be made therein without departing from the spirit and scope of my invention as set forth in the accompanying claims.

I claim as my invention:

1. An automobile windshield comprising a slideable, inclined glass, an inclined air deflector on the outer face of the glass adjacent the top thereof, said deflector projecting outwardly from the plane of the surface of the glass and said deflector, in conjunction with the glass, defining a channel for the reception of the forward portion of the roof of the automobile when the glass is raised, and means for lowering and raising the glass.

2. An automobile windshield comprising a slideable, inclined glass, an air deflector projecting beyond the outer face of the glass adjacent the top edge thereof and sloping outwardly from the glass, the forward portion of the automobile roof defining the windshield opening and having the edge thereof formed to mate with the upper edge of the glass and deflector to form a seal therewith with the deflector sloping outwardly to the roof edge.

3. In an automobile body of the closed type having pillars sloping forwardly from the roof to the cowl defining a windshield opening, a glass for said opening disposed substantially on the slope of said pillars, means for sliding said glass in its plane, and a deflecting element outwardly sloping from the glass surface made of rubber and secured to the upper end of the glass, said deflector at its upper edge being formed to mate with the roof edge forming sealing means with the terminal edge of the roof defining said opening.

4. In an automobile body of the closed type having an opening therein, a slideable window for said opening, sealing means provided at one of the sides of the body defining said opening, and deflector means provided on the abutting edge of the glass having sealing means with said marginal edge and provided with an extension sloping outwardly from the glass for directing air from said glass outwardly over said marginal edge.

5. In an automobile body of the closed type having an opening therein, a marginal edge of said opening forming a channel, a slideable glass closing said opening, and means carried by the edge of the glass adjacent to said channel for entering said channel and forming a seal therewith, said means having a deflecting portion sloping outwardly from said glass for directing air outwardly from the surface thereof.

ALOYSIUS C. DIEHL.